US009660483B2

(12) United States Patent
Kim et al.

(10) Patent No.: US 9,660,483 B2
(45) Date of Patent: May 23, 2017

(54) POWER SUPPLY CONTROL APPARATUS AND POWER SUPPLY CONTROL SYSTEM HAVING THE SAME

(75) Inventors: In Joo Kim, Suwon-si (KR); Seok Gin Kang, Suwon-si (KR); Yong Woon Lee, Suwon-si (KR); Dong Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1225 days.

(21) Appl. No.: 13/484,439

(22) Filed: May 31, 2012

(65) Prior Publication Data
US 2012/0326514 A1 Dec. 27, 2012

(30) Foreign Application Priority Data

Jun. 21, 2011 (KR) ........................ 10-2011-0060174

(51) Int. Cl.
H02M 3/335 (2006.01)
H02J 9/00 (2006.01)

(52) U.S. Cl.
CPC ........... *H02J 9/005* (2013.01); *Y10T 307/625* (2015.04)

(58) Field of Classification Search
CPC .................................................. H02M 3/335
USPC ............................................... 307/85; 363/16
See application file for complete search history.

(56) References Cited

U.S. PATENT DOCUMENTS 7,747,739 B2 * 6/2010 Bridges .................... B60L 3/12
307/80
8,854,838 B2 * 10/2014 Hara ........................ H02J 9/005
363/16
2002/0126517 A1 * 9/2002 Matsukawa ....... H02M 3/33569
363/69
2005/0127871 A1 * 6/2005 Orikasa ............... H01M 6/5033
320/112
2007/0029883 A1 * 2/2007 Yoshida .................... H02J 7/32
307/125
2011/0040785 A1 * 2/2011 Steenberg .......... G05B 23/0235
707/769
2012/0150709 A1 * 6/2012 Kaji ........................ H02J 7/042
705/35

FOREIGN PATENT DOCUMENTS

JP 2011-333546 11/2001
KR 10-0822342 4/2008

* cited by examiner

Primary Examiner — Jared Fureman
Assistant Examiner — Joseph Inge
(74) Attorney, Agent, or Firm — Staas & Halsey LLP

(57) ABSTRACT

A power supply control apparatus is connected to an electric device to control supply of power to the electric device. The apparatus includes a main power switch to apply or interrupt main power to the electric device, the main power being external input commercial AC power, an auxiliary power storage unit supplied and charged with the main power as auxiliary power, a charging/discharging unit including a charging circuit to convert the main power into DC power and charge the converted DC power in the auxiliary power storage unit, and a discharging circuit to convert the DC power in the auxiliary power storage unit into AC power and discharge the converted AC power to the electric device, and a controller to control the main power switch, and control the charging/discharging unit to selectively drive the charging circuit or the discharging circuit.

29 Claims, 13 Drawing Sheets

POWER SUPPLY CONTROL APPARATUS AND POWER SUPPLY CONTROL SYSTEM HAVING THE SAME

CROSS-REFERENCE TO RELATED APPLICATIONS

This application claims the priority benefit of Korean Patent Application No. 10-2011-0060174, filed on Jun. 21, 2011 in the Korean Intellectual Property Office, the disclosure of which is incorporated herein by reference.

BACKGROUND

1. Field

Embodiments relate to a power supply control apparatus of an electric device to reduce standby power to be supplied to the electric device in a standby mode of the electric device.

2. Description of the Related Art

Recently, as analog and digital technologies make rapid progress, electronic products with up-to-date functions have rapidly come into wide use in homes and workplaces.

The increase in number of such electronic products increases use of power. Particularly, even in the case where a home appliance used in daily life, such as a microwave oven, an air conditioner or an air cleaner, is not in use, an operating voltage may be applied to a printed circuit board (PCB) including various detectors installed in the home appliance immediately after the home appliance is plugged in, resulting in continuous consumption of certain standby power even in a standby state.

The standby power is power consumed when an electric device doesn't perform a main function thereof or waits for an internal or external turn-on signal under the condition that it is connected to an external power source (AC power source).

A television, an air conditioner, a microwave oven, a computer, a mobile phone charger, or the like is a product that consumes a larger amount of power in a standby state where it is connected to the power source even though they do not perform their natural or main functions. Considering how many hours a day a household microwave oven is used, it is easy to see that standby power can contribute to significant waste of energy.

Such an electric device performs a power saving standby mode when it is not used under the condition of being connected to the commercial AC power source. At this time, the electric device may not be completely disconnected from the power source, thus generating standby power of several hundred milliwatts (mW) or several watts (W).

Particularly, in an electric device capable of being remotely controlled by a remote controller, such as a television, an air conditioner or an audio device, minimum power must be supplied to a controller including a remote control signal receiver even if the electric device is stopped in operation. This allows the electric device to receive a remote control signal transmitted from the remote controller and perform a corresponding function when the user operates the remote controller to control the electric device in stop.

For this reason, the electric device capable of being remotely controlled by the remote controller generates a certain amount of standby power to receive a signal from the remote controller in the standby mode.

This standby power accounts for about 11% of domestic household power consumption. In order to reduce the standby power, national sanctions have been applied and a variety of technologies have been developed.

Conventional approaches to reducing the standby power may include a technology to improve efficiency of power in voltage conversion of an existing transformer, and a technology to supply the standby power using an auxiliary power supply, instead of the transformer.

The power efficiency improvement technology is to rectify AC power supplied from a commercial AC power source, supply the resulting voltage to the transformer, convert the voltage to the transformer by intermittently controlling a switching element, and then supply the resulting power for use as the standby power.

Most of the standby power consumed by an electric device is consumed by a remote controller signal receiving circuit to receive a power control signal from a remote controller in the standby mode or by a circuit to receive a power control signal from an external power button. Here, the consumed power is very small. However, when a switched-mode power supply (SMPS), which is used to supply such power, supplies a voltage much lower than a rated voltage, efficiency thereof decreases dramatically, thereby causing power loss to occur by the internal transformer. In this regard, technologies to improve standby mode efficiency of the SMPS have been developed, but, practically, it is very difficult to realize low power on the order of several mW.

Technology to supply standby power using the auxiliary power supply, instead of the transformer, charges a secondary battery or a super capacitor with separate power and uses the charged power as the standby power in the standby mode.

In this case, the charged power is used instead of the normal standby power in the standby mode. However, there may be a limitation in an amount of power to be stored in the secondary battery or the like, requiring recharging of the secondary battery or the like after the lapse of a certain time. Also, if the secondary battery fails to be recharged, it may be discharged completely, thereby making it impossible to guarantee normal operation of the electric device.

SUMMARY

Therefore, it is an aspect one or more embodiments to provide a power supply control apparatus which controls a charging/discharging unit to convert a main power into a direct current (DC) power and to charge auxiliary power or to convert the auxiliary power into an alternating current (AC) power and discharge the converted auxiliary power.

It is another aspect of one or more embodiments to provide a power supply control apparatus which controls a charging/discharging unit depending on a power price fluctuation, to convert the main power into DC power and charge auxiliary power, or to convert the auxiliary power into AC power and discharge the converted auxiliary power.

Additional aspects of the invention will be set forth in part in the description which follows and, in part, will be apparent from the description, or may be learned by practice of the invention.

In accordance with one aspect of one or more embodiments, a power supply control apparatus which is connected to an electric device to control supply of power to the electric device includes a main power switch to apply or interrupt main power to the electric device, the main power being external input commercial alternating current (AC) power, an auxiliary power storage unit supplied and charged with the supplied main power as auxiliary power, a charging/ discharging unit including a charging circuit to convert the main power into direct current (DC) power and charge the converted DC power in the auxiliary power storage unit, and a discharging circuit to convert the DC power in the auxiliary power storage unit into AC power and discharge the converted AC power to the electric device, and a controller to control the main power switch, and control the charging/discharging unit to selectively drive the charging circuit or the discharging circuit.

The charging circuit of the charging/discharging unit may include a rectifier to convert the main power into DC power, and a first DC/DC converter to lower a voltage level of the converted DC power to a certain level such that the converted DC power may be charged in the auxiliary power storage unit, and the discharging circuit of the charging/discharging unit may include a second DC/DC converter to raise a voltage level of the charged auxiliary power to a certain level such that the charged auxiliary power may be applied to the electric device, and an inverter to convert the auxiliary power of the raised voltage level into AC power.

The rectifier may include a bridge diode disposed at an input side of the rectifier, and a capacitor disposed at an output side of the rectifier.

The first DC/DC converter may include a transformer having a primary winding and a secondary winding, a diode, a plurality of capacitors, and an inductor.

The primary winding and the secondary winding may have a turn ratio set in proportion to the voltage level of the auxiliary power.

The second DC/DC converter may be a step-up DC/DC converter including an inductor, a diode, and a capacitor.

The inverter may include a plurality of insulated gate bipolar transistors (IGBTs), each of which may be switched to convert the auxiliary power into AC power.

The apparatus may further include a current detector to detect the amount of current output to the electric device, and an auxiliary power detector to detect the voltage level of the auxiliary power charged in the auxiliary power storage unit.

The controller may compare the current amount detected by the current detector with reference power consumption information to determine a current operation mode of the electric device, determine whether to charge or discharge the auxiliary power, based on the detected voltage level of the auxiliary power, and control the main power switch and the charging/discharging unit according to a result of the determination.

The apparatus may further include a communication unit to communicate with the electric device to receive information about a type of the electric device currently connected with the power supply control apparatus and power consumption information based on an operation mode of the electric device.

The communication unit may transmit information about the current amount detected by the current detector to the electric device.

The communication unit may include a Zigbee or Wi-Fi wireless transmission circuit.

The reference power consumption information may be a power consumption table based on operation modes by electric devices, or power consumption information by operation modes of the electric device currently connected with the power supply control apparatus received through the communication unit.

The controller may retrieve the power consumption information corresponding to the type of the electric device received through the communication unit from the power consumption table.

The controller may determine that the current operation mode of the electric device is a normal mode, when the current amount corresponds to a power level of the normal mode in the retrieved power consumption information, and the current operation mode of the electric device is a standby mode, when the current amount corresponds to a power level of the standby mode in the retrieved power consumption information.

The controller may determines that the auxiliary power needs to be charged, when the auxiliary power voltage level is lower than or equal to a predetermined reference voltage level.

The controller may turn on the main power switch and control the charging/discharging unit to drive the charging circuit, when the current operation mode of the electric device is the normal mode and the auxiliary power is determined to need to be charged.

The controller may turn off the main power switch to stop supplying the main power to the electric device and control the charging/discharging unit to drive the discharging circuit, when the current operation mode of the electric device is the standby mode and the auxiliary power voltage level is higher than the reference voltage level.

The controller may turn on the main power switch and control the charging/discharging unit to drive the charging circuit, when the current operation mode of the electric device is the standby mode and the auxiliary power is determined to be charged.

The apparatus may further include an external switch to receive a user's operating command instructing the electric device to stay in an off mode, which is a state that the power supply to the electric device is interrupted.

In accordance with another aspect of one or more embodiments, a power supply control apparatus which is connected to an electric device to control supply of power to the electric device may include a communication unit to externally receive a power price or a price level corresponding to the power price, a main power switch to apply or interrupt main power to the electric device, the main power being external input commercial alternating current (AC) power, an auxiliary power storage unit supplied and charged with the main power as auxiliary power, a charging/discharging unit including a charging circuit to convert the main power into direct current (DC) power and charge the converted DC power in the auxiliary power storage unit and a discharging circuit to convert the DC power in the auxiliary power storage unit into AC power and discharge the converted AC power to the electric device, and a controller to control the main power switch and control the charging/discharging unit to selectively drive the charging circuit or the discharging circuit, based on the power price or price level fluctuation received through the communication unit.

The charging circuit of the charging/discharging unit may include a rectifier to convert the main power into DC power, and a first DC/DC converter to lower a voltage level of the converted DC power to a certain level such that the converted DC power is charged in the auxiliary power storage unit, and the discharging circuit of the charging/discharging unit may include a second DC/DC converter to raise a voltage level of the charged auxiliary power to a certain level such that the charged auxiliary power is applied to the electric device and an inverter to convert the auxiliary power of the raised voltage level into AC power.

The apparatus may further include an auxiliary power detector to detect the voltage level of the auxiliary power charged in the auxiliary power storage unit.

The controller may determine the auxiliary power to need to be charged and control the charging/discharging unit to drive the charging circuit, when the auxiliary power voltage level is lower than or equal to a predetermined reference voltage level and the power price or price level is lower than or equal to a predetermined reference value.

The apparatus may further include a current detector to detect the amount of current output to the electric device, wherein the controller may determine a current operation mode of the electric device, based on the current detected in the current detector and reference power consumption information, and control the main power switch and the charging/discharging unit according to a result of the determination.

The controller may determine that the current operation mode of the electric is the normal mode when the current amount corresponds to a power level of the normal mode in the reference power consumption information, and determine that the current operation mode of the electric device is standby mode when the current amount corresponds to a power level of the standby mode in the reference power consumption information.

The controller may turn on the main power switch and control the charging/discharging unit to drive the charging circuit, when the current operation mode of the electric device is the normal mode and the auxiliary power is determined to need to be charged.

The controller may turn on the main power switch and control the charging/discharging unit to drive the charging circuit, when the current operation mode of the electric device is the standby mode and the auxiliary power is determined to need to be charged.

BRIEF DESCRIPTION OF THE DRAWINGS

These and/or other aspects of one or more embodiments will become apparent and more readily appreciated from the following description of the embodiments, taken in conjunction with the accompanying drawings of which.

DETAILED DESCRIPTION

Figure 1:
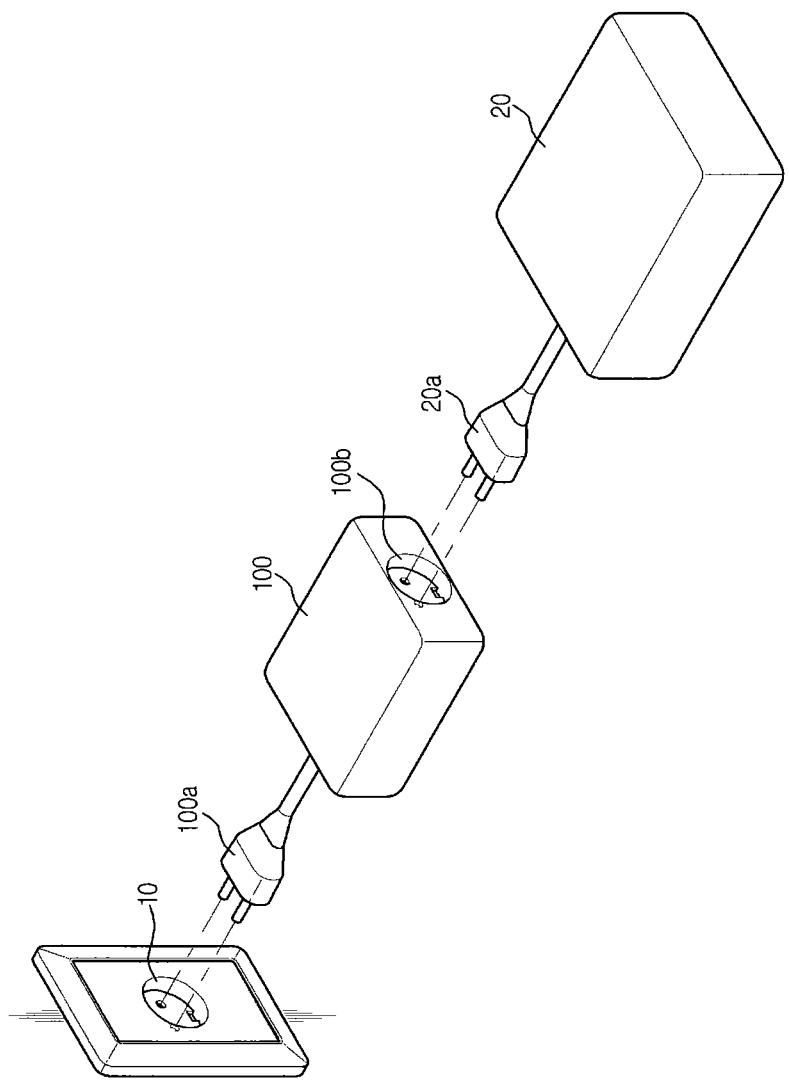
FIG. 1 is a perspective view showing an example of a power supply control apparatus connected to an electric device according to an embodiment.

Reference will now be made in detail to embodiments, examples of which are illustrated in the accompanying drawings, wherein like reference numerals refer to like elements throughout.

Hereinafter, a power supply control apparatus of an electric device and a power supply system including the same according to embodiments will be explained with reference to the accompanying drawings.

FIG. 1 is a perspective view showing an example of a power supply control apparatus connected to an electric device according to an embodiment.

Referring to FIG. 1, the power supply control apparatus 100 includes an input plug 100a which is connected to an external power source to receive commercial alternating current (AC) power from the external power source, and an output outlet 100b to supply AC power to the electric device 20. In other words, in the power supply control apparatus 100, the input plug 100a is inserted into an outlet 10 of the external power source to receive the commercial AC power from the external power source, and the output outlet 100b receives a plug 20a of the electric device 20 inserted thereinto to supply power to the electric device 20.

The power supply control apparatus 100 receives main power through the input plug 100a, and supplies the main power itself or auxiliary power stored in the power supply control apparatus 100 to the electric device 20 through the output outlet 100b.

More specifically, depending on whether the electric device is in a standby mode or not and depending on a voltage level of the stored auxiliary power, the power supply control apparatus 100 supplies the main power itself to the electric device, or converts the auxiliary power stored in the form of direct current (DC) power, into AC power and supplies the converted AC power to the electric device.

Figure 2:
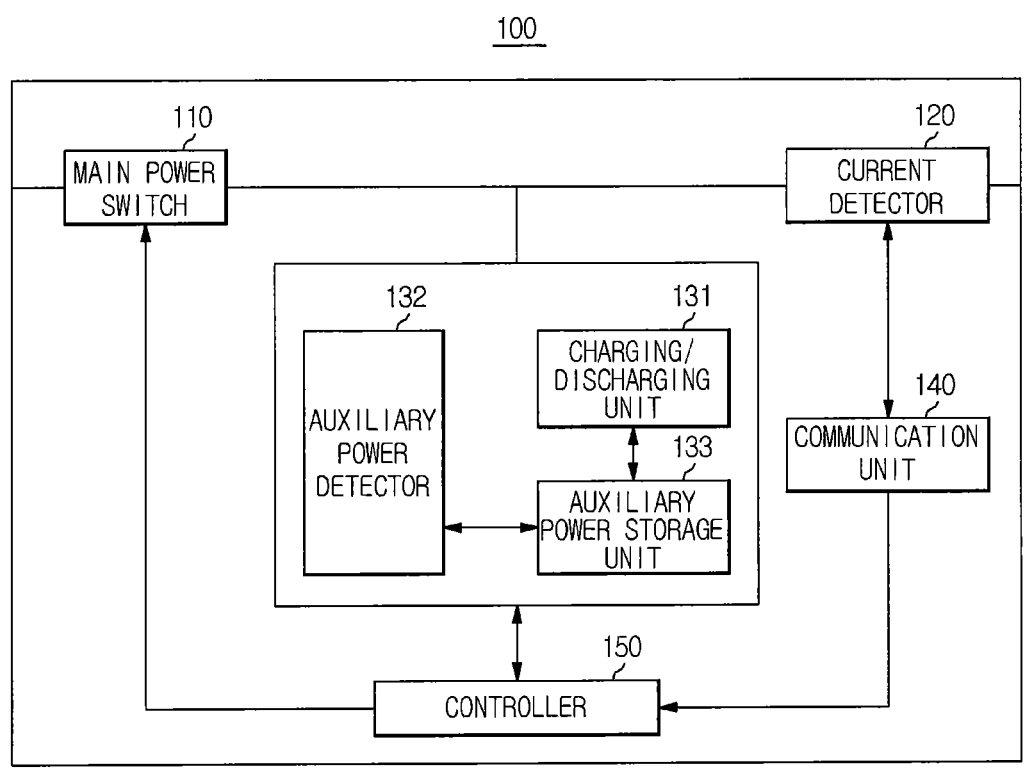
FIG. 2 is a block diagram showing an internal configuration of the power supply control apparatus shown in FIG. 1.

FIG. 2 is a block diagram showing an internal configuration of the power supply control apparatus 100 shown in FIG. 1.

Referring to FIG. 2, the power supply control apparatus 100 according to an embodiment may includes a part which supplies the auxiliary power in the standby mode of the electric device 20 and a part which supplies the main power in a normal mode of the electric device 20.

More specifically, the power supply control apparatus 100 includes a main power switch 110, a current detector 120, a charging/discharging unit 131, an auxiliary power detector 132, an auxiliary power storage unit 133, a communication unit 140, and a controller 150.

The main power switch 110 may include a switch of a type that is turned off at normal times and is turned on by an external physical pressure or electrical signal.

Figure 3:
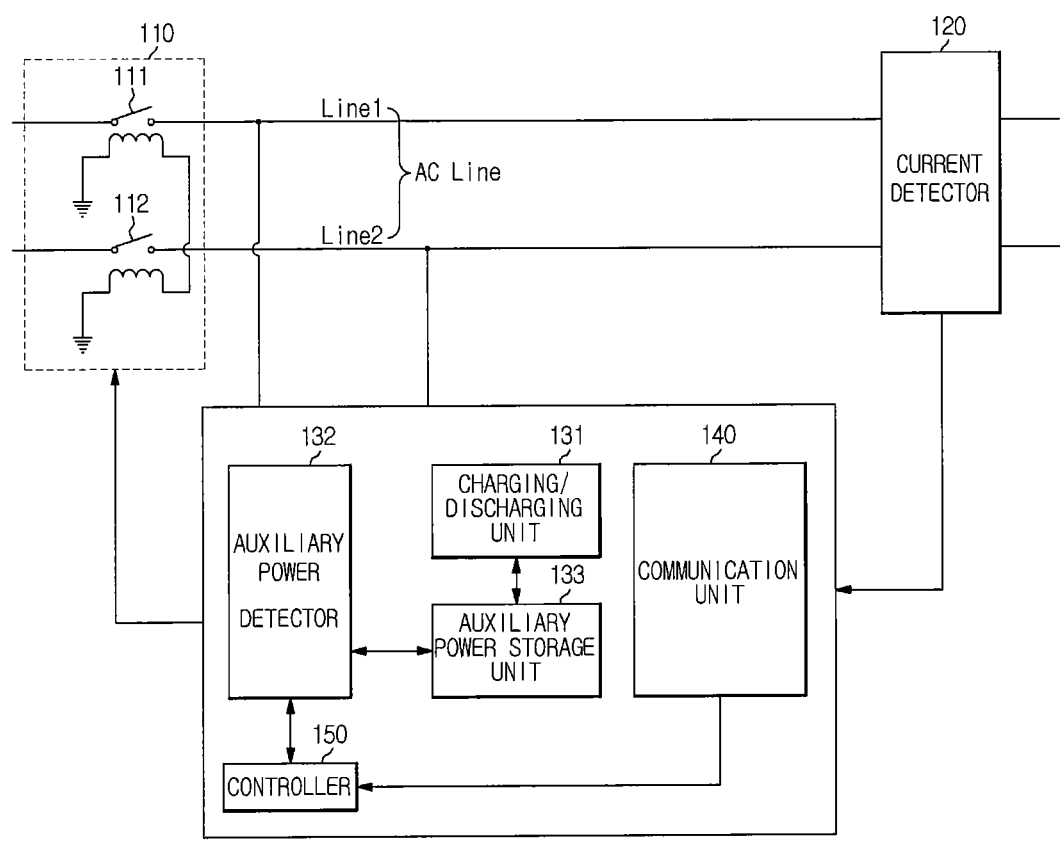
FIG. 3 is a diagram showing a circuit configuration and connection structure of a main power switch.

The main power switch 110 according to an embodiment includes, as shown in FIG. 3, a plurality of relays 111 and 112 disposed in commercial AC power input sides of a first line Line1 and a second line Line2, respectively. The first line Line1 and the second line Line2 constitute a power supply line AC Line which supplies power to the electric device.

When a voltage based on a control signal from the controller 150 is applied to the main power switch 110, the main power switch 110 is turned on to output the main power, which is the commercial AC power, to the electric device 20 through the power supply line AC Line. Also, upon interruption of the voltage based on the control signal, the main power switch 110 is turned off to interrupt the output of the main power through the power supply line AC Line.

The current detector 120 is disposed on the power supply line (AC Line) to detect the amount of current which flows to the electric device 20 through the power supply line AC Line.

The current detector 120 detects the amount of current of the main power when the main power switch 110 is turned on, and the amount of current of the auxiliary power in the auxiliary power storage unit 133 when the main power switch 110 is turned off.

The current detector 120 may include a current transformer (CT). The CT is a measuring transformer which is used for measurement by an AC ammeter. The CT includes a primary coil and a secondary coil to transform current of a high voltage into current of a low voltage.

The current detector 120 delivers the detected current amount to the controller 150 to provide it as information for determination of an operation mode of the electric device. Also, the current detector 120 may deliver the detected current amount to the communication unit 140 such that the communication unit 140 may transmit current information currently provided to the electric device to an external device.

The charging/discharging unit 131 converts the main power input into DC power, stores the converted DC power as the auxiliary power in the auxiliary power storage unit 133, and again converts the stored auxiliary power into AC power such that the converted AC power is output to the electric device 20.

Figure 4:
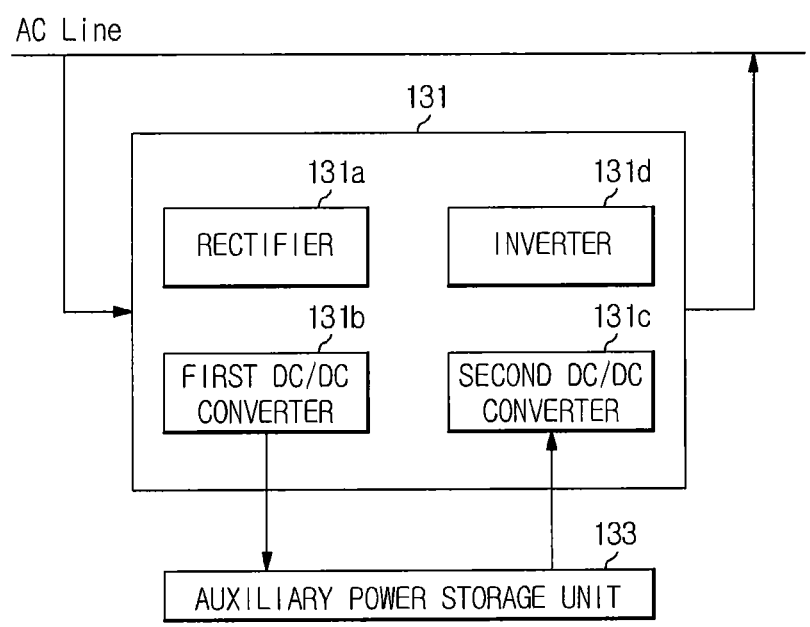
FIG. 4 is a detailed block diagram of a charging/discharging unit.
Figure 5:
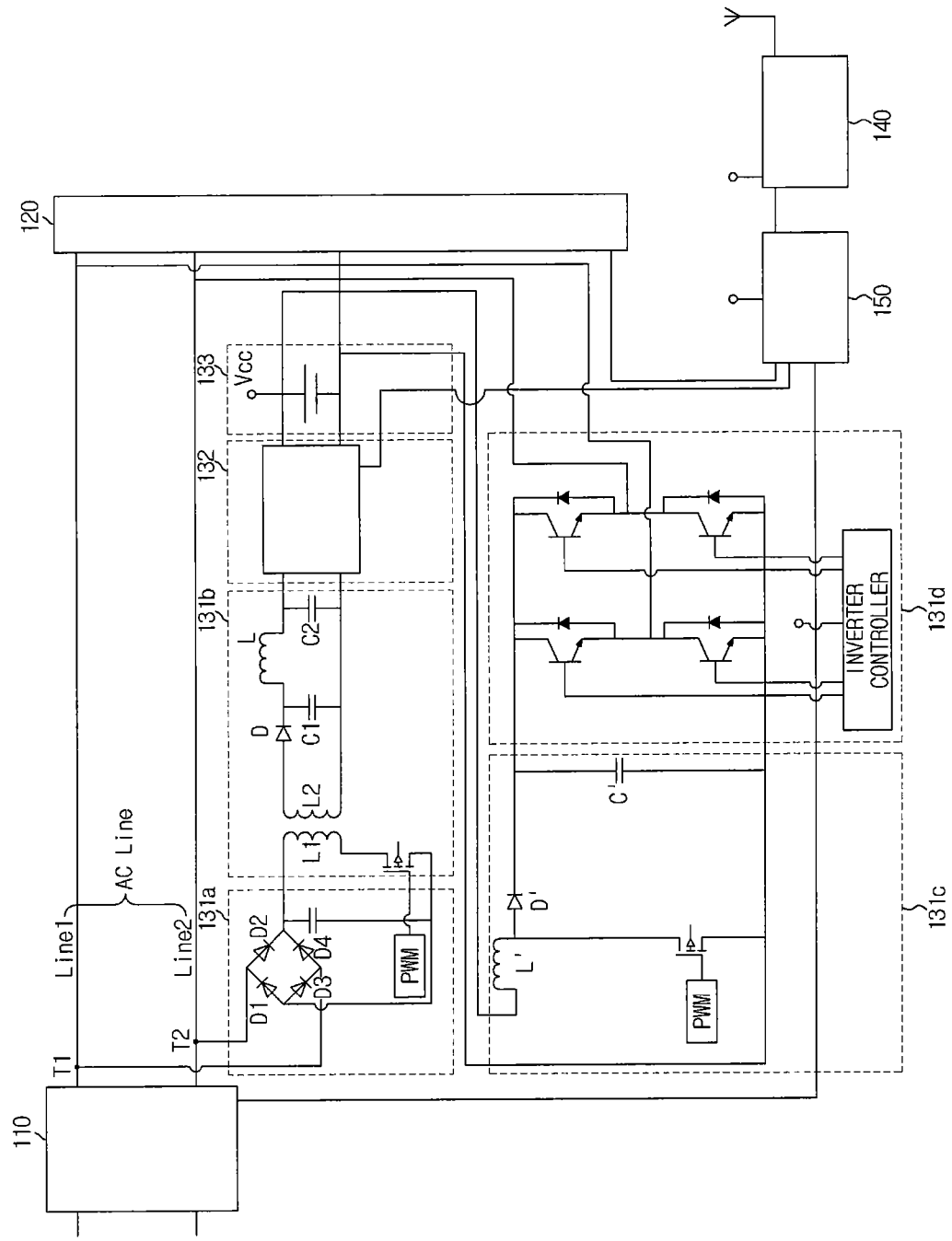
FIG. 5 is a detailed circuit diagram of the charging/discharging unit.

A configuration and an internal circuit of the charging/discharging unit 131 are shown in FIGS. 4 and 5, respectively.

Referring to FIGS. 4 and 5, the charging/discharging unit 131 includes a rectifier 131a to convert the main power, which is the commercial AC power, into DC power, a first DC/DC converter 131b to lower the voltage level of the converted DC power to a certain value to store the converted DC power in the auxiliary power storage unit 133, a second DC/DC converter 131c to raise the voltage level of the auxiliary power stored in the auxiliary power storage unit 133 to a certain value to output to the electric device 20, and an inverter 131d to convert the auxiliary power of the raised voltage level into AC power.

The operation of the charging/discharging unit 131 will hereinafter be schematically described. The main power, which is the commercial AC power, is converted into DC power through the rectifier 131a and first DC/DC converter 131b, which constitute a charging circuit, and then charged as the auxiliary power in the auxiliary power storage unit 133. Also, the auxiliary power charged in the auxiliary power storage unit 133 is discharged in the form of AC power through the second DC/DC converter 131c and inverter 131d, which constitute a discharging circuit.

The rectifier 131a includes a rectifying circuit to rectify AC power periodically having a positive voltage component and a negative voltage component into DC power having a ripple component, and a smoothing circuit to remove the ripple component from the DC power.

More specifically, the rectifying circuit outputs the DC power having the ripple component, because the AC power alternately has the positive voltage component and the negative voltage component. The efficiency of the rectifier 131a is determined depending on performance of the rectifying circuit. The rectifying circuit is generally provided with a plurality of diodes. The rectifying circuit may be any one of a variety of rectifying circuits, for example, a half-wave rectifying circuit, a full-wave rectifying circuit and a bridge rectifying circuit according to a desired diode connection structure.

In an embodiment, the bridge rectifying circuit, which has the best efficiency among the various rectifying circuits, is employed.

More specifically, the rectifying circuit according to an embodiment has a bridge diode structure including a first diode D1, a second diode D2, a third diode D3 and a fourth diode D4.

Further, the rectifying circuit is disposed between a first input terminal T1 and a second input terminal T2, which are connected respectively to the first line Line1 and the second line Line2 of the commercial AC power input sides of the AC power supply line AC Line. More specifically, a connection point between a cathode of the first diode D1 and an anode of the second diode D2 is connected to the second input terminal T2, and a connection point between a cathode of the third diode D3 and an anode of the fourth diode D4 is connected to the first input terminal T1. A connection point between cathodes of the second diode D2 and fourth diode D4 is connected to an output terminal connected to the smoothing circuit. A connection point between anodes of the first diode D1 and third diode D3 is connected to the first DC/DC converter 131b through a pulse width modulation (PWM) control circuit.

The smoothing circuit may include a capacitor C. The capacitor acts to charge itself with charges when an input voltage is lower than or equal to a predetermined voltage, and discharge the charged charges when the input voltage is higher than the predetermined voltage, so as to keep an output voltage constant.

In other words, the capacitor C lowers the input voltage when the input voltage is high and raises the input voltage when the input voltage is low, thereby keeping the output voltage constant.

The first DC/DC converter 131b, connected to the rectifier 131a, lowers the voltage level of the DC power output from the rectifier 131a to a certain level such that the DC power is charged in the auxiliary power storage unit 133. For example, if a commercial AC voltage of 220V is input to the rectifier 131a, a DC voltage of about 310V is generally output from the rectifier 131a. Because this voltage is not appropriate to be charged in the auxiliary power storage unit 133, it is lowered to about 5 to 10V through the DC/DC converter 131b.

The first DC/DC converter 131b has an input connected to the rectifier 131a and an output connected to the auxiliary power detector 132 as shown in FIG. 5.

The first DC/DC converter 131b includes a transformer having a primary winding L1 and a secondary winding L2, a diode D, first and second capacitors C1 and C2, and an inductor L.

A turn ratio of the primary winding L1 and secondary winding L2 of the transformer may be set in proportion to an auxiliary voltage level VCC of the auxiliary power storage unit 133. The auxiliary voltage level VCC may be varied according to a PWM control signal. More specifically, the auxiliary voltage level VCC may be changed through a change in period of the PWM control signal, and the turn ratio of the transformer may be set in proportion to the changed auxiliary voltage level VCC.

The diode D, the first and second capacitors C1 and C2, and the inductor L are disposed at a side of the secondary winding L2 of the transformer. The diode D is disposed on a positive pole line of the secondary winding L2, and has a cathode disposed toward the output of the first DC/DC converter 131b. Thus, the transformed DC power may always be rectified toward the output of the first DC/DC converter 131b.

The first and second capacitors C1 and C2 are connected to the cathode of the diode D in parallel between the positive pole line and a negative pole line of the secondary winding L2.

The inductor L is disposed on the positive pole line between the first capacitor C1 and the second capacitor C2. More specifically, the inductor L has one side connected to a connection point between the first capacitor C1 and the positive pole line and the other side connected to a connection point between the second capacitor C2 and the positive pole line.

Hereinafter, a detailed description will be given of the second DC/DC converter 131c and inverter 131d which convert the auxiliary power, charged in the form of DC power in the auxiliary power storage unit 133 through the rectifier 131a and the first DC/DC converter 131b, into AC power to apply the auxiliary power to the electric device.

The auxiliary power stored in the auxiliary power storage unit 133 is discharged according to a control signal such that the voltage level thereof is adjusted, and the auxiliary power of the adjusted voltage level is applied to the inverter 131d such that it is converted into AC power.

The second DC/DC converter 131c includes an input connected to the auxiliary power storage unit 133 and an output connected to the inverter 131d. This second DC/DC converter 131c is implemented with a step-up DC/DC converter may include an inductor L', a diode D' and a capacitor C', so as to step up the voltage of input DC power.

A step-up level of the DC power may be adjusted such that the DC power is appropriate to be applied to the electric device 20. Also, the step-up level may be adjusted according to a change in period of an output signal from the PWM control circuit.

The inverter 131d converts the DC auxiliary power stepped up by the second DC/DC converter 131c into AC power. To this end, the inverter 131d includes four insulated gate bipolar transistors (IGBTs). In the inverter 131d, each IGBT is switched in response to a switching control signal from an inverter controller to convert the auxiliary power into AC power.

The auxiliary power detector 132 is disposed between the charging circuit including the rectifier 131a and the first DC/DC converter 131b, and the auxiliary power storage unit 133.

The auxiliary power detector 132 detects the voltage level of the auxiliary power charged in the auxiliary power storage unit 133 and outputs the detected voltage level to the controller 150.

The auxiliary power storage unit 133 charges itself with the auxiliary power in the form of the DC power supplied from the charging circuit including the rectifier 131a and first DC/DC converter 131b, or supplies the charged auxiliary power to the discharging circuit including the second DC/DC converter 131c and inverter 131d.

This auxiliary power storage unit 133 may include a device capable of being charged with or discharging a DC voltage, such as a secondary battery or super capacitor.

The communication unit 140 communicates with an external electric device currently connected with the power supply control apparatus 100 to receive information regarding the electric device 20. The information regarding the electric device 20 may include the type of the electric device 20 and power consumption based on an operation mode of the electric device 20. The received electric device information is sent to the controller 150 so as to be used to control the main power switch 110 and the auxiliary power detector 132.

The communication unit 140 also provides the current information from the current detector 120 to the external electric device. As a result, information of the amount of current currently flowing to the electric device 20 may be provided to the electric device 20.

This communication unit 140 may employ a ZigBee or Wi-Fi wireless transmission circuit.

The controller 150 stores reference power consumption information for determination of the operation mode of the currently connected electric device in a memory (not shown).

The reference power consumption information may be a power consumption table based on operation modes (for example, normal and standby modes) by electric devices or power consumption information by operation modes of a current electric device received through the communication unit 140.

In the case where the reference power consumption information is the power consumption table, the controller 150 retrieves power consumption information corresponding to the type of the electric device received through the communication unit 140 from the power consumption table and determines the current operation mode of the electric device based on the retrieved power consumption information.

The controller 150 determines, based on the reference power consumption information and the amount of current currently supplied to the electric device, whether the current operation mode of the electric device is the normal mode or the standby mode.

More specifically, the controller 150 compares the current amount sent from the current detector 120 with the reference power consumption information to determine the current operation mode of the electric device. When the current amount corresponds to a power level of the normal mode, the controller 150 determines that the current operation mode of the electric device is the normal mode. On the other hand, in the case where the current amount corresponds to a power level of the standby mode, the controller 150 determines the current operation mode of the electric device to be the standby mode.

Upon determining the current operation mode of the electric device, the controller 150 determines whether to charge or discharge the auxiliary power storage unit 133, according to whether the voltage level of the auxiliary power sent from the auxiliary power detector 132 is higher than a reference voltage level.

If the current operation mode of the electric device and whether to charge or discharge the auxiliary power storage unit 133 are determined in this manner, the controller 150 controls the main power switch 110 and the charging/discharging unit 131 according to the determination results. The controller 150 controls the charging/discharging unit 131 to selectively drive the charging circuit or discharging circuit of the charging/discharging unit 131, and controls the on/off operation of the main power switch 110 in connection with the selective driving.

Figure 6A:
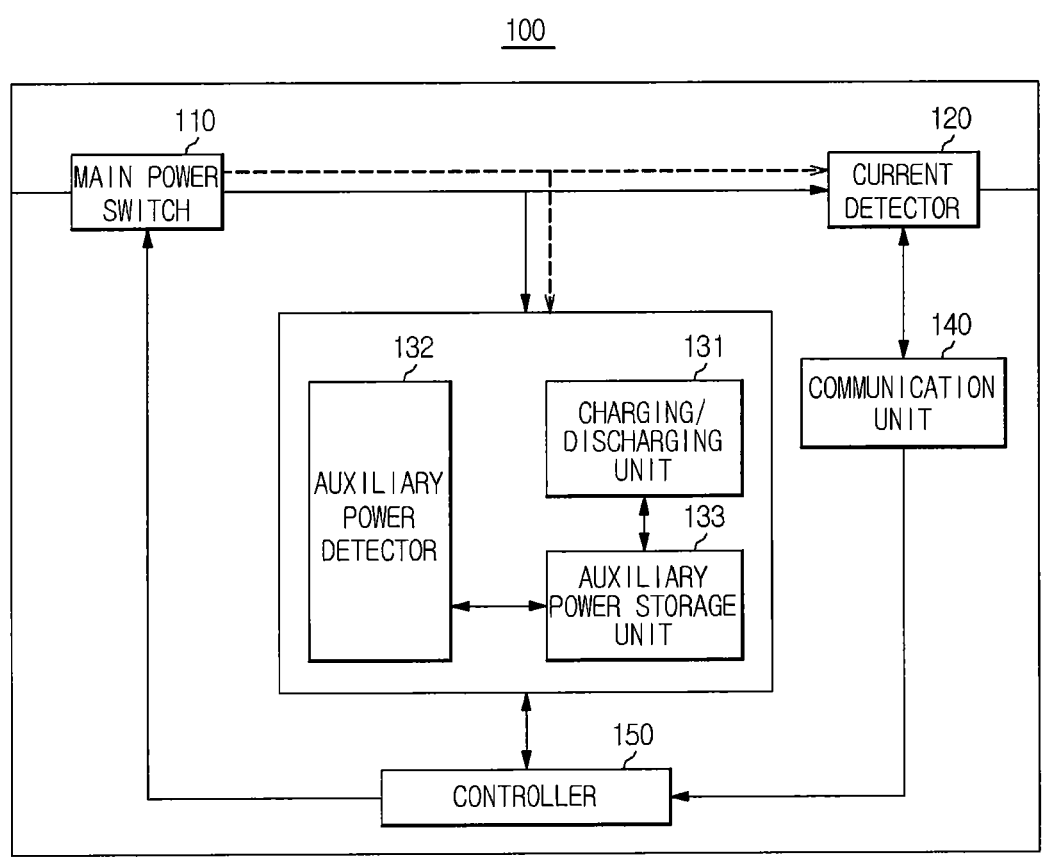
FIG. 6A is a block diagram illustrating current flow in a first mode.

More specifically, in the case where the current operation mode of the electric device is determined to be the normal mode and the voltage level of the auxiliary power is determined to be lower than or equal to the reference voltage level, namely, when charging is determined to be required (first mode), the controller 150 turns on the main power switch 110 as shown in FIG. 6A and applies a control signal to the charging/discharging unit 131 such that the auxiliary power storage unit 133 is charged. Namely, the controller 150 directly applies the externally applied main power to the electric device and controls the charging/discharging unit 131 to charge the auxiliary power storage unit 133 with DC power through the charging circuit of the charging/discharging unit 131.

Figure 6B:
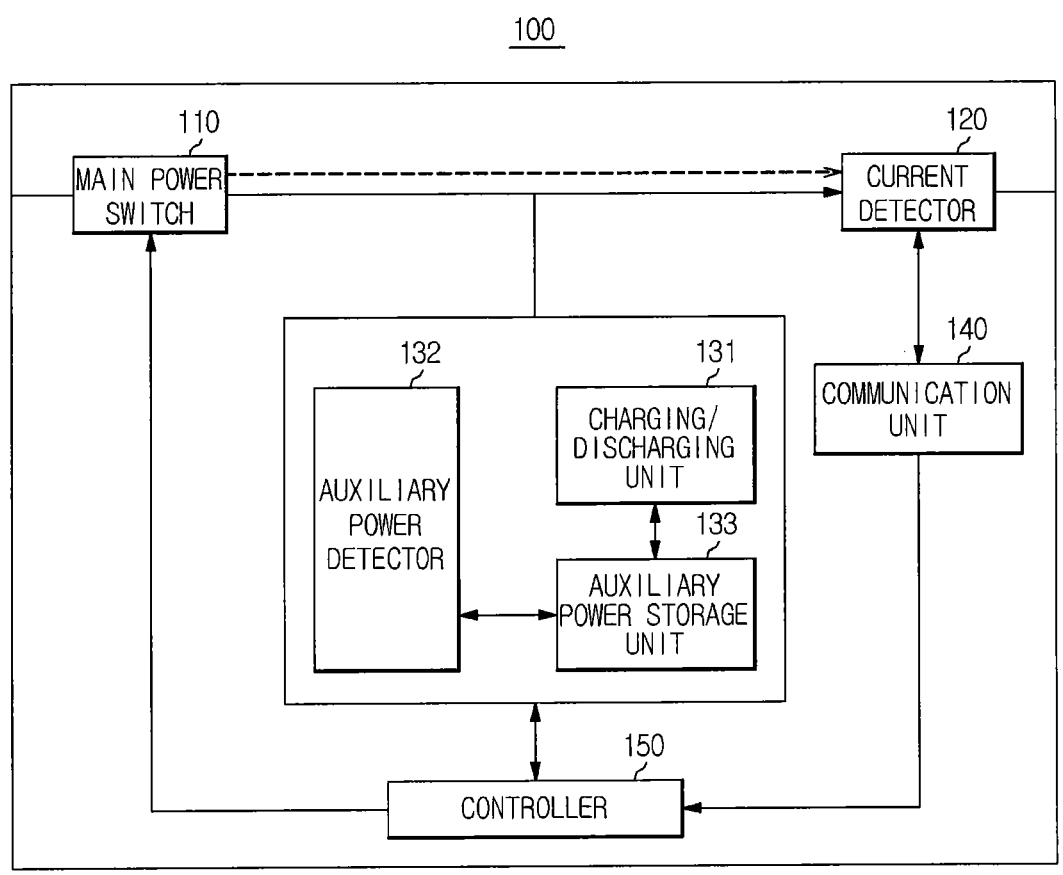
FIG. 6B is a block diagram illustrating current flow in a second mode.

Also, in the case where the current operation mode of the electric device is determined to be the normal mode and the voltage level of the auxiliary power is determined to be higher than the reference voltage level (second mode), the controller 150 turns on the main power switch 110 as shown in FIG. 6B such that the main power is applied to the electric device. Particularly, in the second mode, there is no need to charge or discharge a DC voltage in or from the auxiliary power storage unit 133, so that the controller 150 applies a control signal to the charging/discharging unit 131 to stop the operation of the charging/discharging unit 131.

Figure 6C:
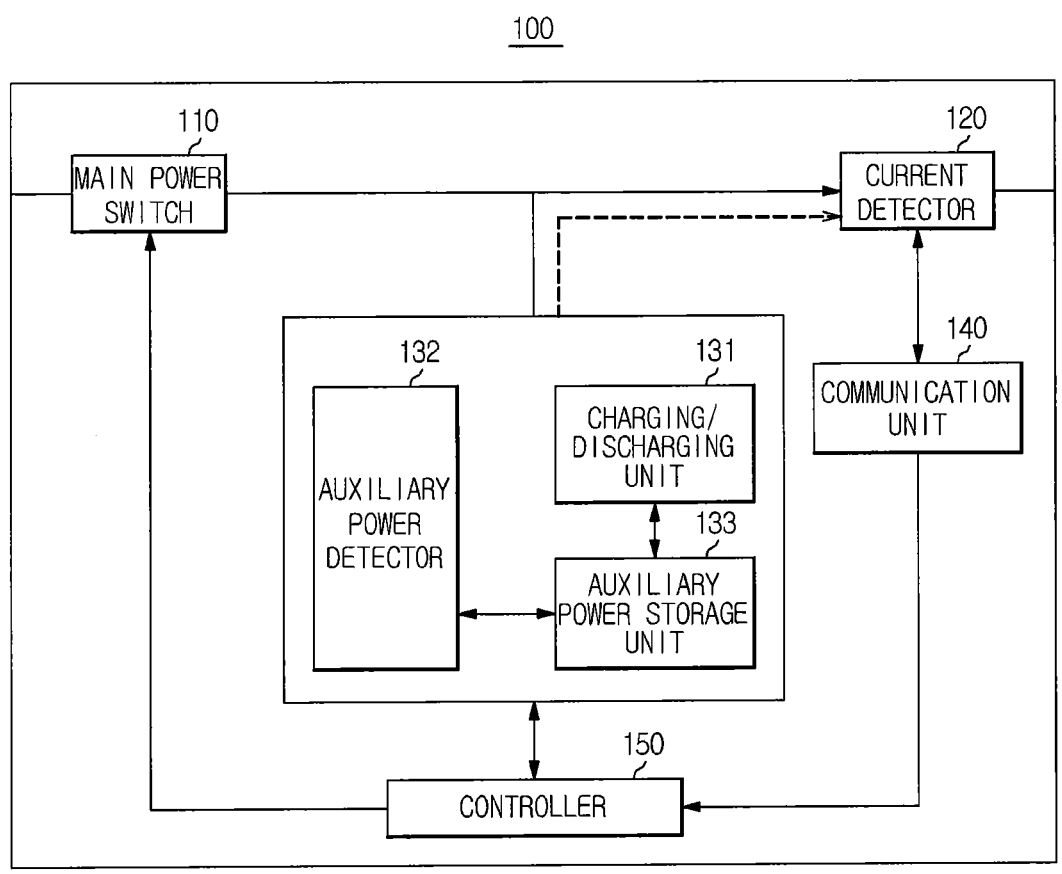
FIG. 6C is a block diagram illustrating current flow in a third mode.

Also, in the case where the current operation mode of the electric device is determined to be the standby mode and the voltage level of the auxiliary power is higher than the reference voltage level (third mode), the controller 150 applies the auxiliary power to the electric device as shown in FIG. 6C. More specifically, the controller 150 turns off the main power switch 110 to stop applying the main power to the electric device, and applies a control signal to the charging/discharging unit 131 to operate the discharging circuit of the charging/discharging unit 131. Upon application of the control signal, the auxiliary power in the form of the DC power is converted into AC power and is then applied to the electric device through the discharging circuit.

Figure 6D:
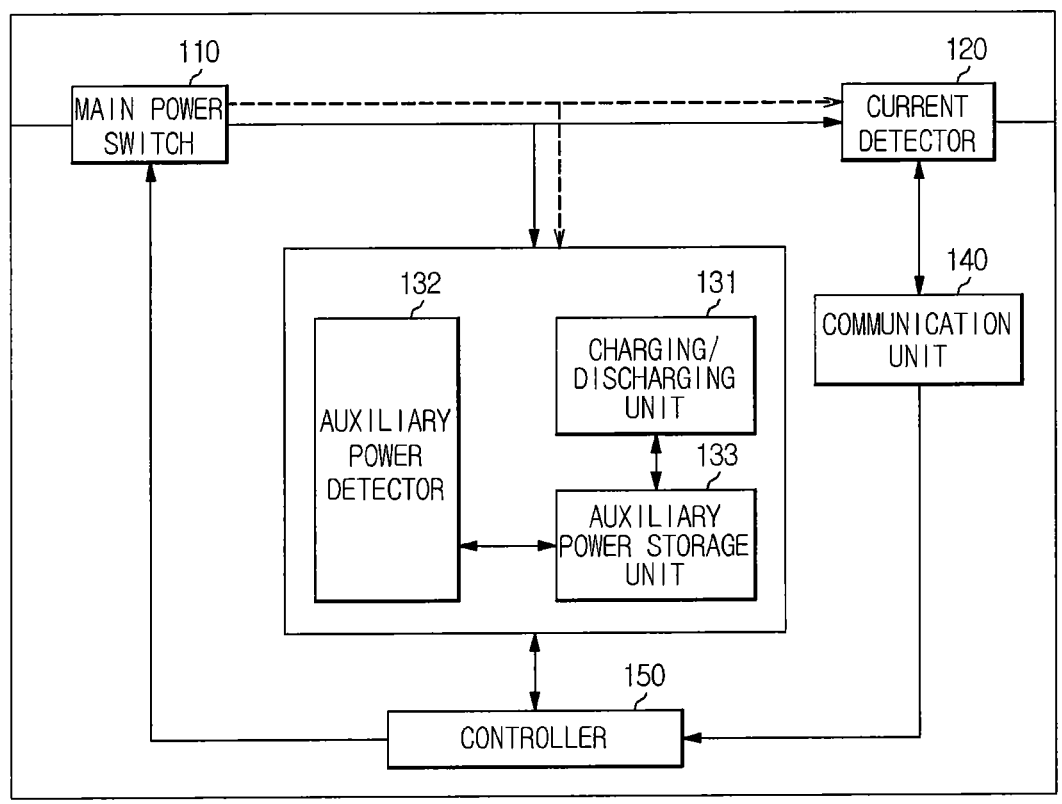
FIG. 6D is a block diagram illustrating current flow in a fourth mode.

Also, in the case where the current operation mode of the electric device is determined to be the standby mode and the voltage level of the auxiliary power is lower than or equal to the reference voltage level (fourth mode), the controller 150 again turns on the main power switch 110 to supply the main power to the electric device as shown in FIG. 6D, and applies a control signal to the charging/discharging unit 131 to operate the charging circuit of the charging/discharging unit 131. Namely, in the case where the voltage level of the auxiliary power storage unit 133 is lower than or equal to a certain level even in the standby mode, the controller 150 supplies the main power to the electric device again to prevent the power supply from being stopped in the standby mode and to recharge the auxiliary power in the auxiliary power storage unit 133.

Therefore, when the standby mode is entered, the power supply control apparatus 100 according to an embodiment, as described above, stops supplying the external main power and supplies the auxiliary power pre-stored in the apparatus 100 to the electric device, so as to reduce the standby power.

Also, the power supply control apparatus 100 further includes the configuration of the discharging circuit to convert the auxiliary power in the form of the DC power into AC power usable by the electric device, so as to supply the AC power to the electric device. As a result, even in the case where the electric device is directly supplied with DC power, an inconvenience of changing the internal circuit configuration of the electric device may be solved.

Figure 7:
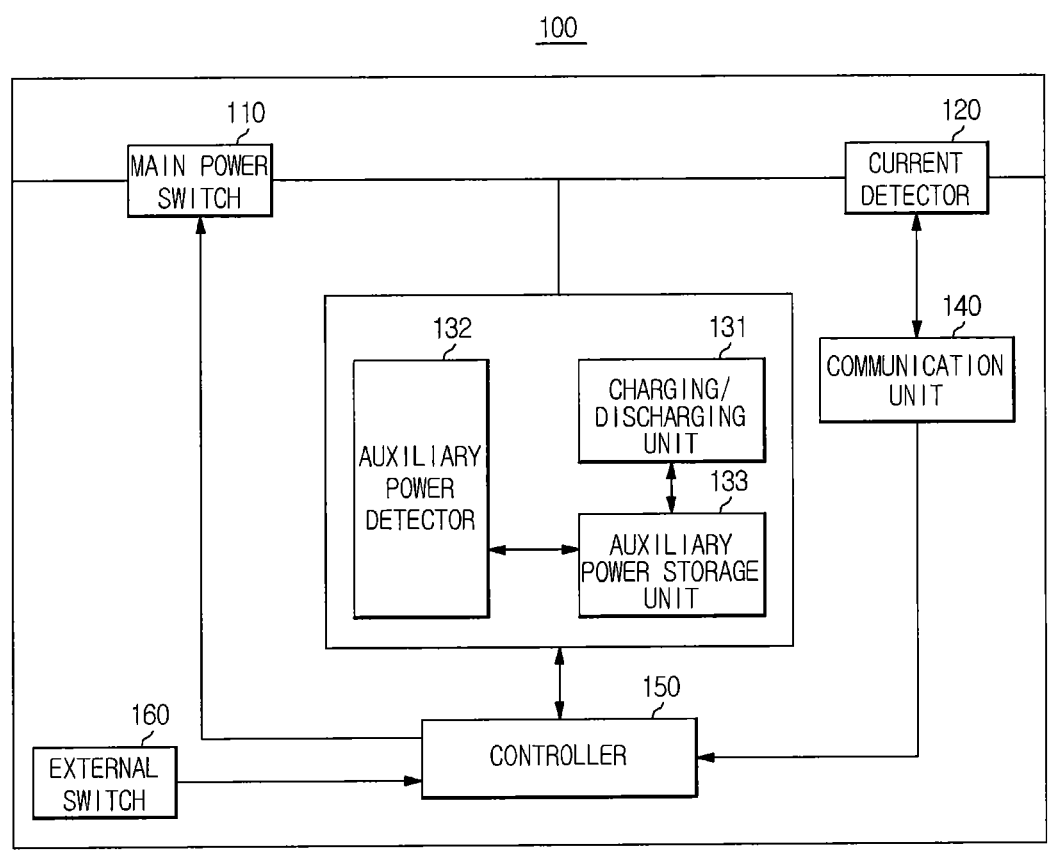
FIG. 7 is a block diagram showing an internal configuration of a power supply control apparatus according to another embodiment.

FIG. 7 is a block diagram showing an internal configuration of a power supply control apparatus according to another embodiment.

Referring to FIG. 7, the power supply control apparatus 100 according to an embodiment, includes a main power switch 110, a current detector 120, a charging/discharging unit 131, an auxiliary power detector 132, an auxiliary power storage unit 133, a communication unit 140, and a controller 150.

Particularly, in an embodiment, the apparatus 100 further includes an external switch 160 connected to the controller 150 such that the electric device may stay in an off mode. Here, the off mode refers to a state that the electric device is not operated, as if it were disconnected from external commercial AC power due to removal of a plug, differently from a standby mode, which is a state in which the electric device may resume operation according to a wakeup signal from a remote controller or network.

Therefore, according to an embodiment, the user may operate the external switch 160 to prevent standby power from being consumed. More specifically, when the user operates the external switch 160, the controller 150 turns off the main power switch 110 and controls the charging/discharging unit 131 such that charging and discharging circuits of the charging/discharging unit 131 are not driven. As a result, the electric device is supplied with neither of external main power and auxiliary power stored in the power supply control apparatus 100, so that it may stay in the off mode.

Other components and operations of the power supply control apparatus 100 are the same as those described above, and a description thereof will thus be replaced with the description of FIG. 2 to FIG. 6D.

Figure 8:
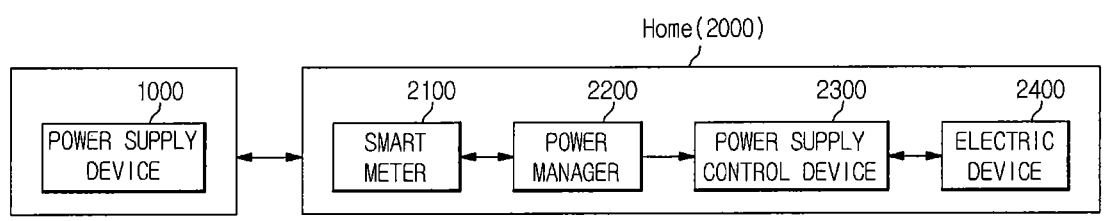
FIG. 8 is a block diagram schematically showing a configuration of a power supply system according to another embodiment.

FIG. 8 is a block diagram schematically showing a configuration of a power supply system according to another embodiment.

Referring to FIG. 8, the power supply system according to an embodiment includes a power supply device 1000, a smart meter 2100, a power manager 2200, a power supply control device 2300, and an electric device 2400.

The power supply device 1000 is a power supply source that is run by a utility company to produce and supply power, which is generated by generation of nuclear power, hydropower, thermal power, wind power, or the like and supplied to the electric device 2400 in each home 2000.

Power supplied by the utility company is constant at all times, whereas power consumed in each home 2000 is different at different times. For example, each home 2000 consumes a smaller amount of power at dawn or in the morning than in the afternoon or evening. Also, each home 2000 consumes a smaller amount of power in spring and autumn than that in summer and winter.

As a result, the power supply device 1000 sets a power price at a time when power consumption is small, to be lower than the power price at a time when power consumption is large, and sets a power price in a season in which power consumption is small, to be lower than the power price in a season in which power consumption is large, and supplies powers of the set power prices to each home 2000.

In this manner, the power supply device 1000 sets power prices flexibly in connection with power consumptions of each home 2000 so as to keep the balance of supply and consumption of power.

The power supply device 1000 estimates the amounts of power consumption based on the amount of generated power, past power usage information by seasons and times and weather information, and sets power prices based on the estimated power consumption amounts.

Also, the power supply device 1000 may set power prices to price levels divided based on a certain criterion The power supply device 1000 collects and stores the amounts of power consumption of each home 2000 according to power prices, so that the utility company may calculate a power rate for each home 2000 on a monthly basis and charge the calculated power rate to each home 2000 monthly.

The power supply device 1000 is connected with the smart meter 2100, power manager 2200, power supply control device 2300 and electric device 2400, provided in each home 2000, via a network, to send and receive information for management of the demand for power. The network includes a wireless network and a wired and wireless hybrid network, as well as a wired network.

The smart meter 2100 is installed in each home 2000, and includes a display, such as a liquid crystal display (LCD), to display the amount of power consumed in each home 2000 in real time.

The smart meter 2100 is an electronic watt-hour meter which bi-directionally communicates with the power supply device 1000 and power manager 2200 to transmit the amount of consumed power thereto.

The smart meter 2100 receives power price information transmitted from the power supply device 1000, and not only displays the received power price information such that the user may see the power price information, but also sends the power price information to the power manager 2200.

Also, upon receiving the power price information from the power supply device 1000, the smart meter 2100 may display a price level corresponding to the power price information together.

The price level may be set to any one of four levels (RTP1 to RTP4) which correspond to different power prices and permissible instantaneous powers, respectively. Here, the level RTP1 is lowest and the level RTP4 is highest. The price level is proportional to the power price. Although the price level according to an embodiment described above has been set to any one of the four levels, it may be set in a different manner based on a power price setting criterion of the power supply device 1000.

Meanwhile, upon receiving the power price information and price level information from the power supply device 1000, the smart meter 2100 may send both information to the power manager 2200.

The power manager 2200 is also called a demand response (DR) controller.

The power manager 2200 communicates with the smart meter 2100 to receive the power price and the price level corresponding to the power price from the smart meter 2100, and communicates with the electric device 2400 to receive information of the electric device 2400 from the electric device 2400. The power manager 2200 also controls the operation of the electric device 2400 based on the power price received from the smart meter 2100 and the electric device information.

Also, the power manager 2200 according to an embodiment communicates with the power supply control device 2300 connected with the electric device 2400 to send the received power price and price level to the power supply control device 2300.

The electric device 2400 may be a television, washing machine, drier, air conditioner, cooktop, electric oven, or the like, which may have a communication capability. Thus, the electric device 2400 is operated in response to an operating command from the user or power manager 2200. Also, the electric device 2400 measures the amount of power consumed during operation thereof and sends the measurement result to the power manager 2200.

The electric device 2400 may be connected with the power supply control device 2300. The power supply control device 2300 controls the supply of power to the electric device 2400 to reduce standby power to be consumed in a state that the electric device 2400 is connected to a commercial AC power source, but is stopped in operation.

The power supply control device 2300 determines whether the electric device 2400 is in a normal mode or standby mode and whether auxiliary power has been sufficiently charged in the power supply control device 2300. As a result of the determination, the power supply control device 2300 supplies main power, which is commercial AC power, directly to the electric device 2400, or stops supplying the main power and supplies the auxiliary power to the electric device 2400.

Also, the power supply control device 2300 receives the power price and price level from the external power manager 2200 and determines whether to charge the auxiliary power based on the power price and the price level.

Hereinafter, the configuration and operation of the power supply control device 2300 included in the power supply system will be described in detail with reference to FIG. 9 and FIG. 10.

Figure 9:
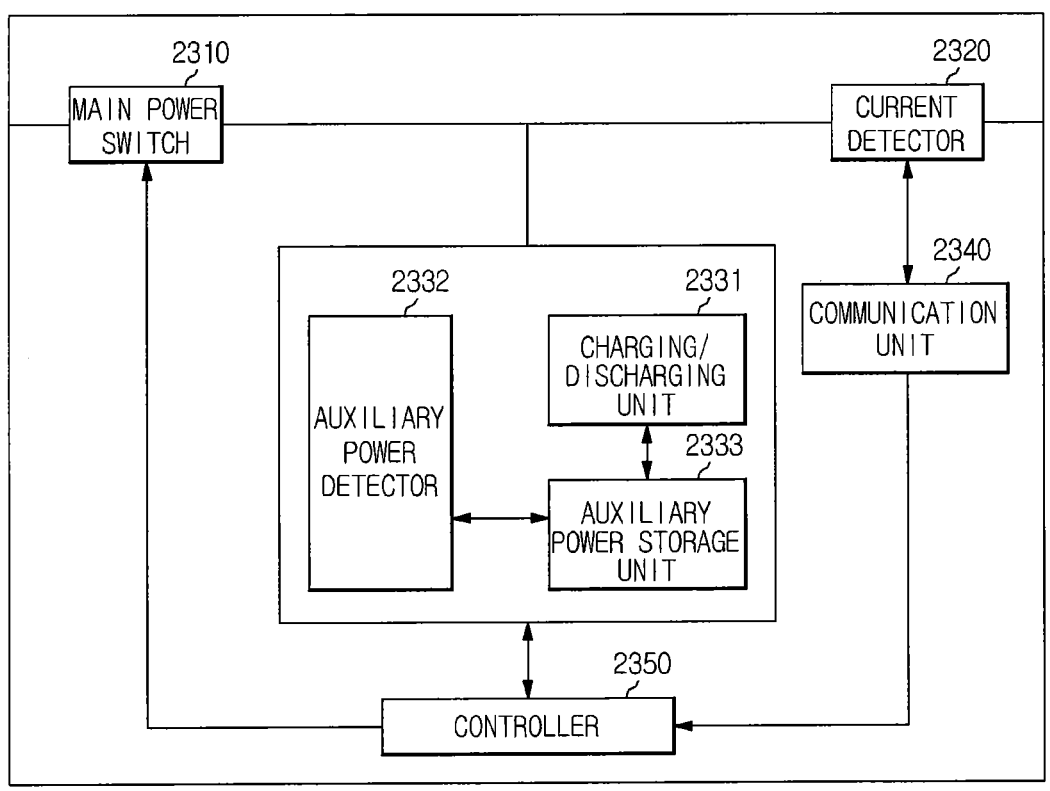
FIG. 9 is a block diagram showing an embodiment of a power supply control device shown in FIG. 8.

Referring to FIG. 9, the power supply control device 2300 according to an embodiment includes a main power switch 2310, current detector 2320, charging/discharging unit 2331, auxiliary power detector 2332, auxiliary power storage unit 2333, communication unit 2340, and controller 2350.

The main power switch 2310 performs on/off control for application of the main power, which is the commercial AC power, to the electric device 2400 in response to a control signal from the controller 2350.

The current detector 2320 detects current applied to the electric device 2400 and sends the detection result to the controller 2350 or communication unit 2340.

The charging/discharging unit 2331 includes a charging circuit to convert the main power into DC power and store the converted DC power in the auxiliary power storage unit 2333 as the auxiliary power, and a discharging circuit to convert the auxiliary power in the auxiliary power storage unit 2333 into AC power and apply the converted AC power to the electric device 2400.

The auxiliary power detector 2332 detects a voltage level of the auxiliary power charged in the auxiliary power storage unit 2333 and outputs the detected voltage level to the controller 2350.

The auxiliary power storage unit 2333 charges itself with the DC power delivered from the charging circuit of the charging/discharging unit 2331 as the auxiliary power, or supplies the charged auxiliary power to the discharging circuit. Namely, the auxiliary power storage unit 2333 stores the auxiliary power in DC form.

The communication unit 2340 communicates with the electric device 2400 to receive, from the electric device 2400, information about the type of the electric device 2400 and power consumption information based on the operation mode of the electric device 2400.

The communication unit 2340 also provides current information from the current detector 2320 to the electric device 2400.

In particular, the communication unit 2340 according to an embodiment communicates with the external power manager 2200 to receive the power price and the price level corresponding to the power price from the power manager 2200, and provides the power price and price level to the controller 2350. Namely, the communication unit 2340 provides real-time price level fluctuation information to the controller 2350 such that the controller 2350 determines whether to charge the auxiliary power.

The controller 2350 determines, based on reference power consumption information and the amount of current currently applied to the electric device 2400, whether the electric device 2400 operates in the standby mode. Here, the reference power consumption information may be a reference power consumption table based on operation modes by electric devices, or power consumption information by operation modes of a current electric device received through communication unit 2340. The reference power consumption table may be pre-stored in a memory (not shown).

The controller 2350 also controls charging/discharging of the auxiliary power storage unit 2333 based on the auxiliary power voltage level received from the auxiliary power detector 2332.

Particularly, the controller 2350 according to an embodiment determines whether to charge the auxiliary power, based on the price level fluctuation information received from the communication unit 2340.

More specifically, when the price level is lowest, the controller 2350 sends a control signal to the charging/discharging unit 2331 such that the auxiliary power is charged. Here, the lowest price level may be RTP1, which corresponds to the lowest power price among, for example, four levels RTP1 to RTP4.

Meanwhile, the controller 2350 of an embodiment may control the charging/discharging unit such that the auxiliary power is charged only when the price level is lowest. Alternately, the controller 2350 may control the charging/discharging unit such that the auxiliary power is charged not only when the price level is lowest, but also when the price level is lower than or equal to a predetermined price level. Namely, when the power price is determined to be adequately low, the auxiliary power is charged.

As a result, the controller 2350 may determine whether to supply the main power or whether to charge the auxiliary power, depending on the current operation mode of the electric device 2400, auxiliary power voltage level and real-time power price.

More specifically, when the electric device 2400 currently operates in the normal mode and the auxiliary power voltage level is lower than or equal to a reference voltage level, the controller 2350 determines that the main power switch 2310 is turned on to apply the main power to the electric device 2400 and the auxiliary power is charged. Here, the auxiliary power may be charged only when the real-time power price level received from the communication unit 2340 is lower than or equal to the predetermined price level.

Also, when the electric device 2400 currently operates in the normal mode and the auxiliary power voltage level is higher than the reference voltage level, the controller 2350 applies the main power to the electric device 2400 and sends a control signal to the charging/discharging unit 2331 such that the charging circuit and the discharging circuit are not operated. Namely, the auxiliary power is controlled to remain at its current state.

Also, when the electric device 2400 currently operates in the standby mode and the auxiliary power voltage level is higher than the reference voltage revel, the controller 2350 supplies the auxiliary power to the electric device 2400.

Also, when the electric device 2400 currently operates in the standby mode and the auxiliary power voltage level is lower than or equal to the reference voltage level, the controller 2350 turns on the main power switch 2310 to prevent the power supply from being stopped even in the standby mode. Also, the auxiliary power is charged only when the current price level is lower than or equal to the predetermined price level.

Other components and operations of the power supply control device 2300 are the same as those described above, and a description thereof will thus be replaced with the description of FIG. 2 to FIG. 6D.

Figure 10:
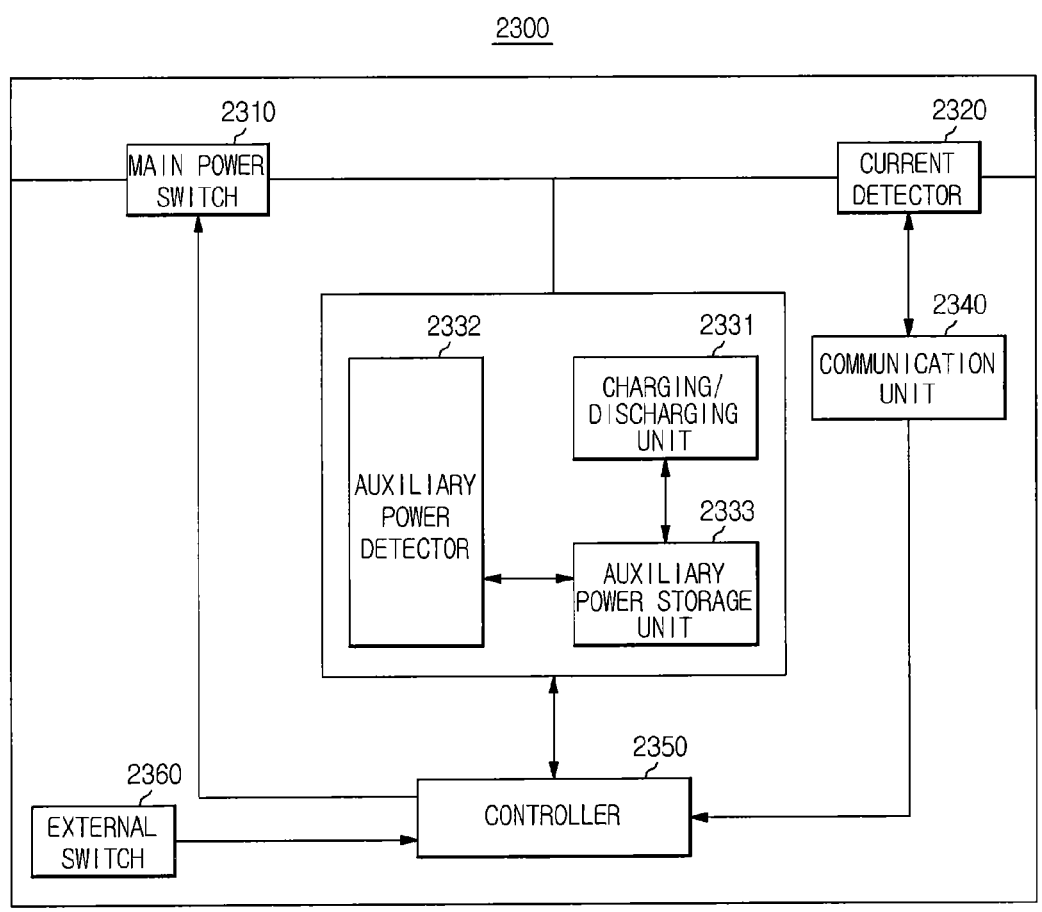
FIG. 10 is a block diagram showing another embodiment of a power supply control device shown in FIG. 8.

Referring to FIG. 10, the power supply control device 2300 according to an embodiment includes the main power switch 2310, current detector 2320, charging/discharging unit 2331, auxiliary power detector 2332, auxiliary power storage unit 2333, communication unit 2340, and controller 2350.

Particularly, in an embodiment, the power supply control device 2300 further includes an external switch 2360 connected to the controller 2350 such that the electric device 2400 may remain in an off mode according to the user selection. The off mode is a state in which the electric device 2400 is disconnected from the external main power due to removal of a plug.

Therefore, according to an embodiment, when the electric device 2400 is not operated in the normal mode according to the user selection, it may be controlled such that no standby power is consumed.

Other components of the power supply control device 2300 and a control process of the power supply control device 2300 based on the electric device 2400 operation mode, auxiliary voltage level and real-time power price are the same as those described above with reference to FIG. 8, and a description thereof will thus be replaced with the description of FIG. 8.

As is apparent from the above description, according to embodiments, a power supply control apparatus may, when a standby mode is entered, stop supplying external commercial AC power to an electric device and supply power pre-stored in the apparatus to the electric device, thereby reducing standby power.

Also, the power supply control apparatus further includes a discharging circuit to convert charged DC power into AC power to be used in the electric device. Thus, it may be possible to solve the inconvenience of changing an internal circuit configuration of the electric device when DC power is directly supplied to the electric device.

Also, a determination is made as to whether to charge auxiliary power based on real-time power price fluctuation information from an external power manager, so that power consumption may be efficiently reduced.

Although a few embodiments have been shown and described, it would be appreciated by those skilled in the art that changes may be made in embodiments without departing from the principles and spirit of the invention, the scope of which is defined in the claims and their equivalents.

What is claimed is:

1. A power supply control apparatus configured to be connected to an electric device to control supply of power to the electric device, the power supply control apparatus comprising:
a main power switch to apply or interrupt main power to the electric device, the main power being input alternating current (AC) power;
an auxiliary power storage unit that is charged with the main power and that stores power;
a communication unit to receive a plurality of power prices or a plurality of price levels corresponding to price fluctuations of power;
a charging/discharging unit comprising a charging circuit to convert the main power into direct current (DC)

power and to supply the converted DC power to the auxiliary power storage unit for charging, and a discharging circuit to convert the power stored in the auxiliary power storage unit into AC auxiliary power and to supply the converted AC auxiliary power to the electric device; and a controller to control the main power switch, in a normal mode to control the charging circuit of the charging/discharging unit to supply the converted DC power to the auxiliary storage unit, and in a standby mode to control the discharging circuit of the charging/discharging unit to supply the converted AC auxiliary power from the auxiliary storage unit to the electric device, wherein the controller controls the main power switch to switch between the normal mode and the standby mode based on the plurality of power prices or the plurality of price levels which correspond to the price fluctuation of power received through the communication unit, wherein the charging circuit of the charging discharging unit comprises a rectifier to convert the main power into DC power, and a first DC/DC converter to lower a voltage level of the converted DC power to a certain level such that the converted DC power is charged in the auxiliary power storage unit, and wherein the discharging circuit of the charging/discharging unit comprises:

a second DC/DC converter to raise a voltage level of the power stored in the auxiliary power storage unit to a certain level such that an inverter converts the raised voltage level of the power stored in the auxiliary power storage unit to the AC auxiliary power.

2. The power supply control apparatus according to claim 1, wherein the rectifier comprises a bridge diode disposed at an input side of the rectifier, and a capacitor disposed at an output side of the rectifier.

3. The power supply control apparatus according to claim 1, wherein the first DC/DC converter comprises a transformer having a primary winding and a secondary winding, a diode, a plurality of capacitors, and an inductor.

4. The power supply control apparatus according to claim 3, wherein the primary winding and the secondary winding have a turn ratio set in proportion to the voltage level of the AC auxiliary power and/or the main power.

5. The power supply control apparatus according to claim 1, wherein the second DC/DC converter circuit is a step-up DC/DC converter, the step-up DC/DC converter comprising an inductor, a diode, and a capacitor.

6. The power supply control apparatus according to claim 1, wherein the inverter comprises a plurality of insulated gate bipolar transistors (IGBTs), each of the IGBTs being switched to convert the power stored in the auxiliary power storage unit to the AC auxiliary power.

7. The power supply control apparatus according to claim 1, further comprising a current detector to detect an amount of current output to the electric device; and an auxiliary power detector to detect the voltage level of the power stored in the auxiliary power storage unit.

8. The power supply control apparatus according to claim 7, wherein the controller compares a current amount detected by the current detector with reference power consumption information to determine a current operation mode of the electric device, determines whether to charge or discharge the auxiliary power, based on the detected voltage level of the power stored in the auxiliary power supply unit, and controls the main power switch and the charging/discharging unit according to a result of the determination.

9. The power supply control apparatus according to claim 8, wherein the communication unit communicates with the electric device to receive information about a type of the electric device currently connected with the power supply control apparatus and to receive information about power consumption information based on the operation mode of the electric device.

10. The power supply control apparatus according to claim 9, wherein the communication unit transmits information about the current amount detected by the current detector to the electric device.

11. The power supply control apparatus according to claim 9, wherein the communication unit comprises a Zigbee or Wi-Fi wireless transmission circuit.

12. The power supply control apparatus according to claim 9, wherein the reference power consumption information comprises a power consumption table based on operation modes by electric devices, or power consumption information by operation modes of the electric device currently connected with the power supply control apparatus received through the communication unit.

13. The power supply control apparatus according to claim 12, wherein the controller retrieves power consumption information corresponding to the type of the electric device received through the communication unit from the power consumption table.

14. The power supply control apparatus according to claim 13, wherein the controller determines that the current operation mode of the electric device is the normal mode, when the detected current amount corresponds to a power level of the normal mode in the retrieved power consumption information, and determines that the current operation mode of the electric device is a standby mode, when the detected current amount corresponds to a power level of the standby mode in the retrieved power consumption information.

15. The power supply control apparatus according to claim 14, wherein the controller determines that the auxiliary power needs to be charged, when the auxiliary power voltage level is lower than or equal to a predetermined reference voltage level.

16. The power supply control apparatus according to claim 15, wherein the controller turns on the main power switch and controls the charging/discharging unit to drive the charging circuit, when the current operation mode of the electric device is the normal mode and the auxiliary power is determined to need to be charged.

17. The power supply control apparatus according to claim 15, wherein the controller turns off the main power switch to stop supplying the main power to the electric device and controls the charging/discharging unit to drive the discharging circuit, when the current operation mode of the electric device is the standby mode and the auxiliary power voltage level is higher than the reference voltage level.

18. The power supply control apparatus according to claim 15, wherein the controller turns on the main power switch and controls the charging/discharging unit to drive the charging circuit, when the current operation mode of the electric device is the standby mode and the auxiliary power is determined to need to be charged.

19. The power supply control apparatus according to claim 1, further comprising an external switch to receive a user's operating command instructing the electric device to stay in an off mode, the off mode being a state that the power supply to the electric device is completely interrupted.

20. A power supply control apparatus which is connected to an electric device to control supply of power to the electric device, the apparatus comprising:
   a communication unit to receive a plurality of power prices or a plurality of price levels corresponding to price fluctuations of power;
   a main power switch to apply or interrupt main power to the electric device, the main power being external input commercial alternating current (AC) power;
   an auxiliary power storage unit that is charged with the main power and that stores power;
   a charging/discharging unit comprising
      a charging circuit to convert the main power into direct current (DC) power and to supply the converted DC power to the auxiliary power storage unit for charging, and
      a discharging circuit to convert the power stored in the auxiliary power storage unit into AC auxiliary power and to supply the converted AC auxiliary power to the electric device; and
   a controller to control the main power switch, in a normal mode to control the charging circuit of the charging/discharging unit to supply the converted D power to the auxiliary storage unit, and in a standby mode to control the discharging circuit, based on the plurality of power prices or the plurality of price levels which correspond to the price fluctuations of power received through the communication unit,
   wherein the charging circuit of the charging/discharging unit comprises
      a rectifier to convert the main power into DC power, and a first DC/DC converter to lower a voltage level of the converted DC power to a certain level such that the converted DC power is charged in the auxiliary power storage unit; and
   wherein the discharging circuit of the charging/discharging unit comprises
      a second DC/DC converter to raise a voltage level of the charged auxiliary power to a certain level such that the charged auxiliary power is applied to the electric device, and
      an inverter to convert the auxiliary power of the raised voltage level into AC power.

21. The power supply control apparatus according to claim 20, further comprising an auxiliary power detector to detect the voltage level of the auxiliary power charged in the auxiliary power storage unit.

22. The power supply control apparatus according to claim 21, wherein the controller determines that the auxiliary power needs to be charged and controls the charging/discharging unit to drive the charging circuit, when the auxiliary power voltage level is lower than or equal to a predetermined reference voltage level and the plurality of power prices or the plurality of price levels is lower than or equal to a predetermined reference value.

23. The power supply control apparatus according to claim 22, further comprising a current detector to detect the amount of current output to the electric device,
   wherein the controller determines a current operation mode of the electric device based on the current amount detected by the current detector and reference power consumption information, and controls the main power switch and the charging/discharging unit according to a result of the determination.

24. The power supply control apparatus according to claim 23, wherein the controller determines that the current operation mode of the electric device is the normal mode, when the detected current amount corresponds to a power level of the normal mode in the reference power consumption information, and determines that the current operation mode of the electric device is a standby mode, when the detected current amount corresponds to a power level of the standby mode in the reference power consumption information.

25. The power supply control apparatus according to claim 24, wherein the controller turns on the main power switch and controls the charging/discharging unit to drive the charging circuit, when the current operation mode of the electric device is the normal mode and the auxiliary power is determined to need to be charged.

26. The power supply control apparatus according to claim 24, wherein the controller turns on the main power switch and controls the charging/discharging unit to drive the charging circuit, when the current operation mode of the electric device is the standby mode and the auxiliary power is determined to need to be charged.

27. A power supply system configured to be connected to an electric device and to control supply of power to the electric device, the power supply system comprising:
   a power supply device which is a power supply source to set a plurality of power prices and/or a plurality of power prices corresponding to price fluctuations of power;
   a smart meter to communicate with the power supply device and to transmit the plurality of power prices and/or the plurality of price levels corresponding to the price fluctuations of power, and to display an amount of power consumed by the electric device;
   a power manager to communicate with the smart meter to receive the plurality of power prices and/or the plurality of price levels corresponding to the price fluctuations of power, to communicate with the electric device to receive information from the electric device, to control operations of the electric device based on the plurality of power prices and/or the plurality of price levels received from the smart meter and the electric device information; and
   a power supply control device, including an auxiliary storage unit to store auxiliary power, to determine whether the electric device is in a normal mode or a standby mode and whether the auxiliary power unit has been sufficiently charged, to supply main power to the electric device or to stop supplying the main power and to supply the stored auxiliary power to the electric device, and to receive the plurality of power prices and/or the plurality of price levels from the power manager and to determine whether to charge the auxiliary power unit based on the received plurality of power prices and/or the received plurality of price levels,
   wherein the power supply control device, in the normal mode, controls a charging circuit of a charging/discharging unit of the power supply control device to supply converted DC power to the auxiliary storage unit, and in the standby mode, controls a discharging circuit of the charging/discharging unit of the power supply device to supply converted AC auxiliary power from the auxiliary storage unit to the electric device based on the received plurality of power prices and/or the received plurality of price levels, wherein the charging circuit of the charging discharging unit comprises a rectifier to convert the main power into DC power, and a first DC/DC converter to lower a voltage level of the converted DC power to a certain level such that the converted DC power is charged in the auxiliary power storage unit, and wherein the discharging circuit of the charging/discharging unit comprises:

a second DC/DC converter to raise a voltage level of the power stored in the auxiliary power storage unit to a certain level such that an inverter converts the raised voltage level of the power stored in the auxiliary power storage unit to the AC auxiliary power.

28. The power supply system according to claim 27, wherein the smart meter is an electronic watt-hour meter which bi-directionally communicates with the power supply device and the power manager to transmit the amount of consumed power.

29. The power supply system according to claim 27, wherein the power manager is a demand response (DR) controller.

* * * * *